United States Patent
Schwartz et al.

(10) Patent No.: US 10,969,523 B1
(45) Date of Patent: Apr. 6, 2021

(54) APPARATUS AND METHOD TO OBTAIN INTRINSIC STILL AND VIDEO IMAGES WITHOUT THE USE OF FILTERS OR DICHROIC MIRRORS

(71) Applicant: Center for Quantitative Cytometry, San Juan, PR (US)

(72) Inventors: Abraham Schwartz, San Juan, PR (US); Philip Sherman, Cleveland, OH (US); Emma Fernandez Repollet, San Juan, PR (US)

(73) Assignee: CENTER FOR QUANTITATIVE CYTOMETRY, San Juan, PR (US)

( * ) Notice: Subject to any disclaimer, the term of this patent is extended or adjusted under 35 U.S.C. 154(b) by 0 days.

(21) Appl. No.: 16/888,660

(22) Filed: May 30, 2020

Related U.S. Application Data

(63) Continuation-in-part of application No. 16/657,956, filed on Oct. 18, 2019, now Pat. No. 10,670,512.

(51) Int. Cl.
| | | |
|---|---|---|
| *G02B 5/02* | (2006.01) | |
| *G06T 7/80* | (2017.01) | |
| *G03B 11/06* | (2021.01) | |
| *G02B 5/26* | (2006.01) | |
| *G03B 17/12* | (2021.01) | |

(52) U.S. Cl.
CPC ......... *G02B 5/0263* (2013.01); *G02B 5/0252* (2013.01); *G02B 5/26* (2013.01); *G03B 11/06* (2013.01); *G03B 17/12* (2013.01); *G06T 7/80* (2017.01)

(58) Field of Classification Search
CPC ...... G02B 5/0263; G02B 5/0252; G02B 5/26; G06T 7/80; G03B 11/06; G03B 17/12
See application file for complete search history.

(56) References Cited

U.S. PATENT DOCUMENTS

| | | | |
|---|---|---|---|
| 5,317,140 A * | 5/1994 | Dunthorn | G06F 3/0421 250/206.1 |
| 7,701,489 B1 * | 4/2010 | Christie | H04N 9/0451 348/224.1 |
| 2013/0089256 A1 * | 4/2013 | Tsukada | G06K 9/00 382/167 |

OTHER PUBLICATIONS

Barrow et al., "Recovering Intrinsic Scene Characteristics From Images", Jan. 1978, Computer Vision Systems, Academic Press, pp. 2-25 (Year: 1978).*

(Continued)

*Primary Examiner* — David P Porta
*Assistant Examiner* — Jeremy S Valentiner
(74) *Attorney, Agent, or Firm* — Hoglund & Pamias, PSC; Roberto J. Rios

(57) ABSTRACT

An apparatus and method to generate intrinsic images without barrier filters and dichroic mirrors is provided. The method involves acquisition of an image of a focused field of view and a diffused image of the same field of view. The diffused image is obtained by placing a translucent material in the path between a camera and the field of view. The translucent material permits transmission of the illumination energy while diffusing the spatial details of the field of view, thus producing a featureless image of illumination intensities. The focused and diffused images are then processed pixel-by-pixel by to generate intrinsic images free of irrelevant illumination.

45 Claims, 17 Drawing Sheets

(56) References Cited

OTHER PUBLICATIONS

Chen et al., A Simple Model for Intrinsic Image Decomposition with Depth Cues, Proceedings of the IEEE International Conference on Computer Vision (ICCV), Dec. 2013, pp. 241-248 (Year: 2013).*
ICCV Conference, Sydney Australia, Dec. 2013 (Year: 2013).*

* cited by examiner

Focused Configuration

Diffused Configuration

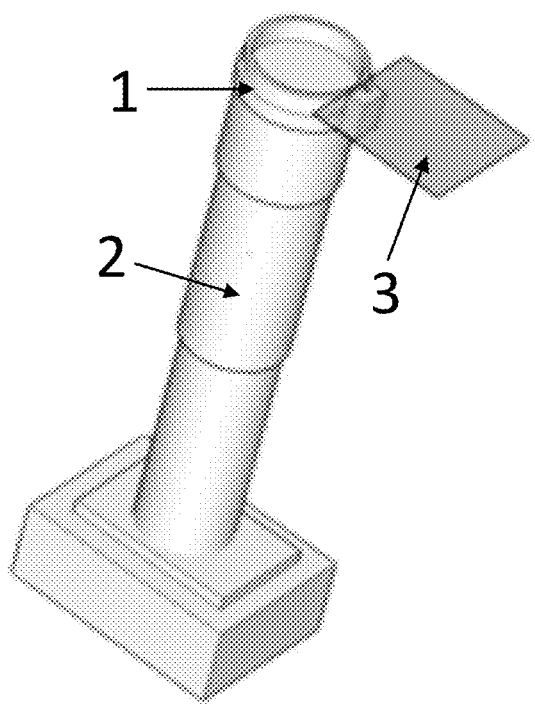
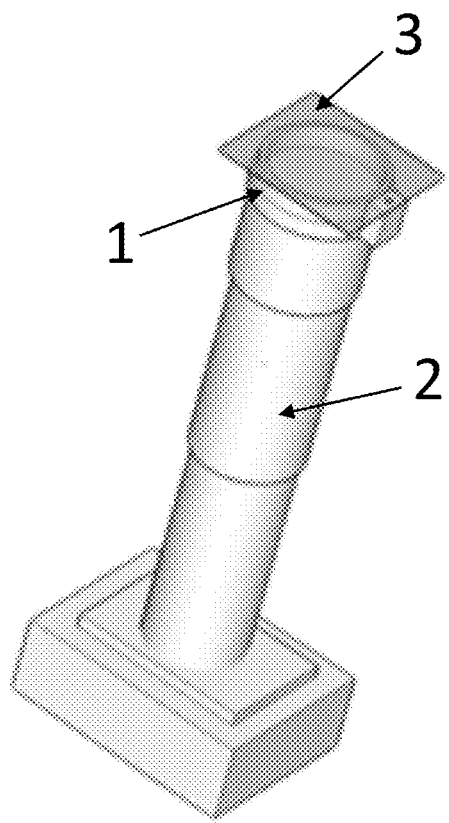
FIGURE 2a  FIGURE 2b

Front View

Focused Configuration

Diffused Configuration

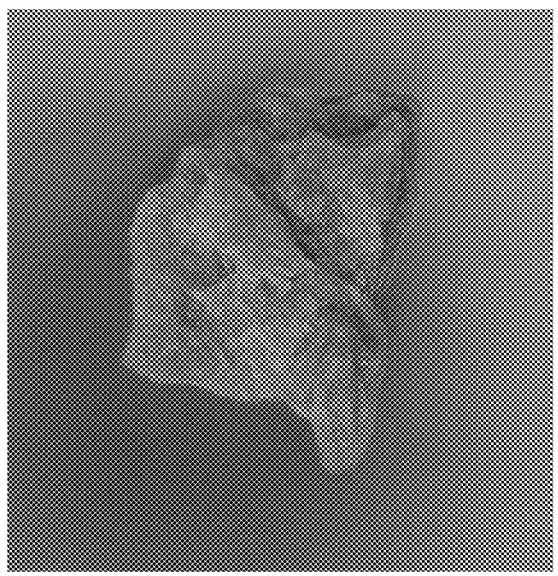 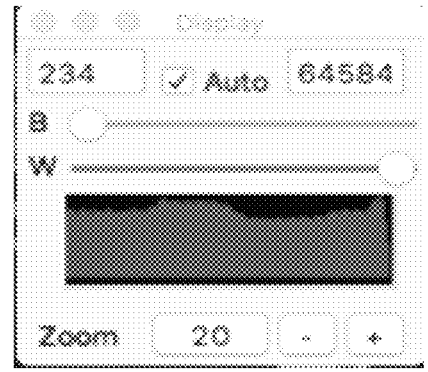
Focused Tremolite
Illumination 390nm
100% Intensity
FIGURE 6a
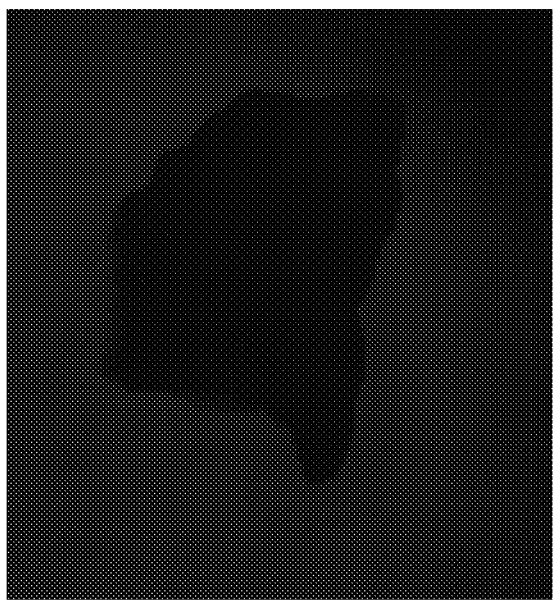 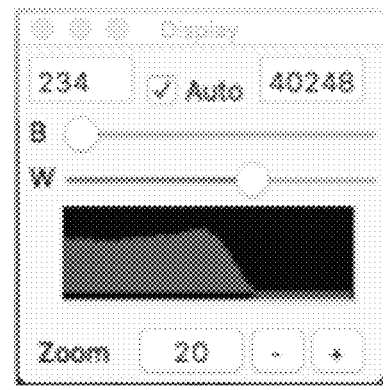
Intrinsic Tremolite
Simple Processing
62.3% Intensity
FIGURE 6b

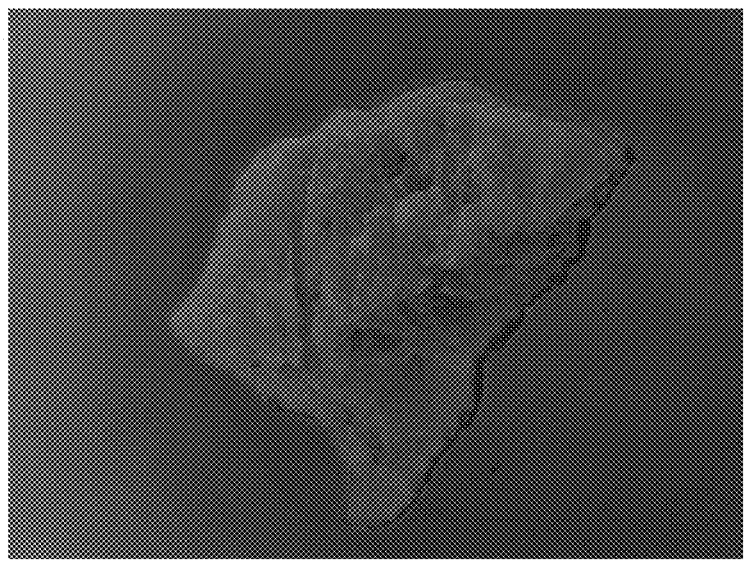 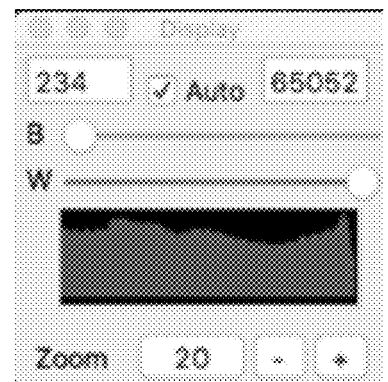
Focused Tremolite Illumination 390nm
100% Intensity
FIGURE 7a
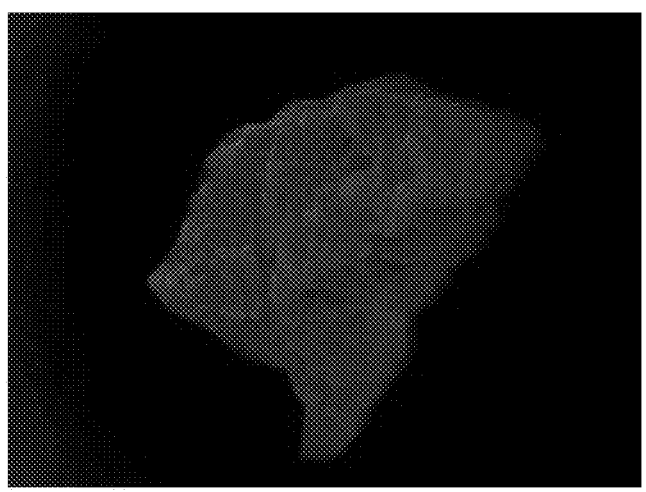 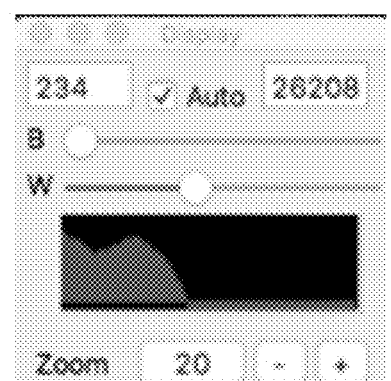
Intrinsic Tremolite Simple Processing
40.3% Intensity
FIGURE 7b

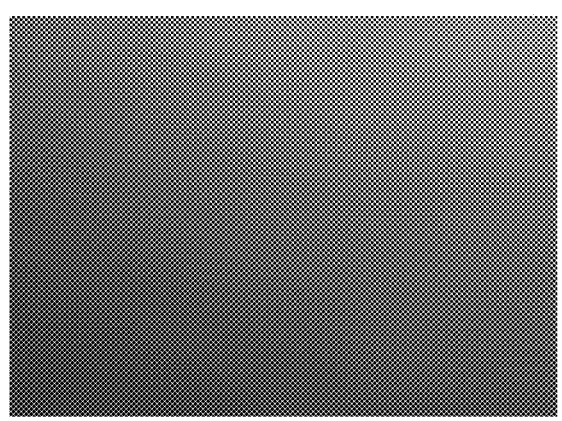 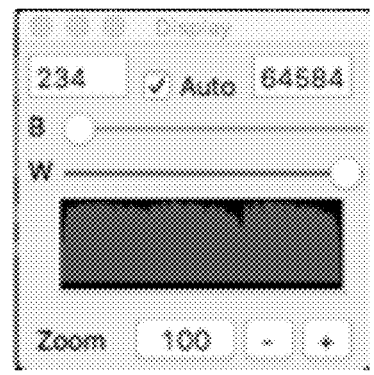
100% Intensity
FIGURE 8a
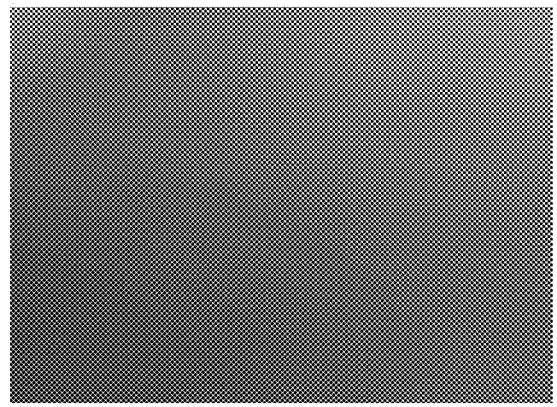
FIGURE 8b
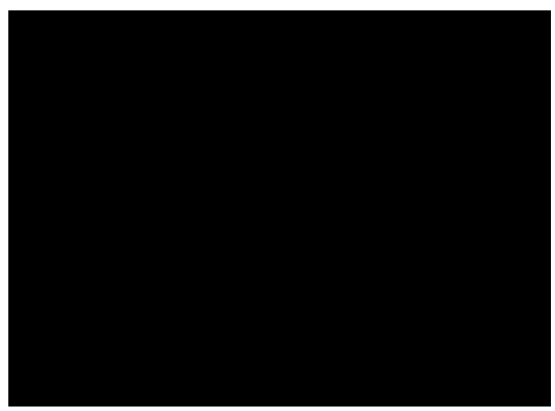 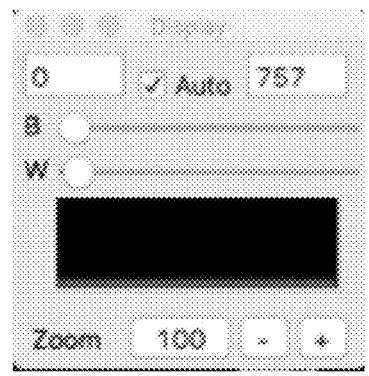
1.2% Intensity
FIGURE 8c

100% Intensity

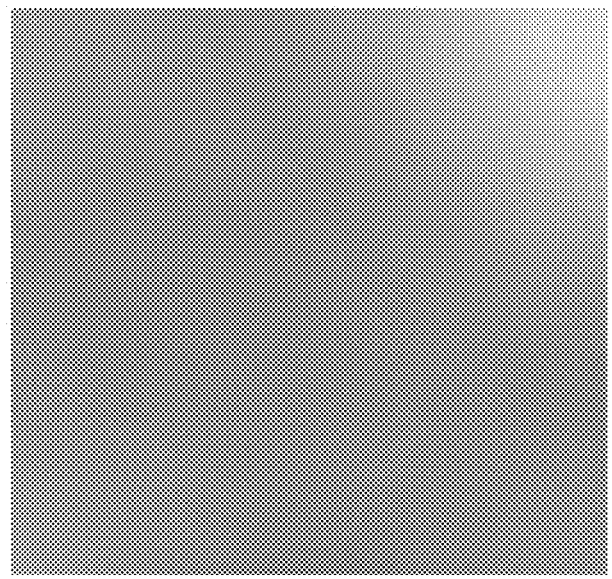
FIGURE 12b
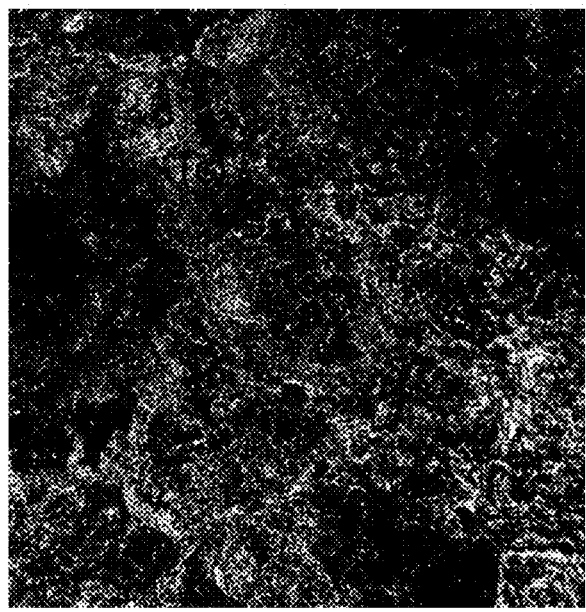
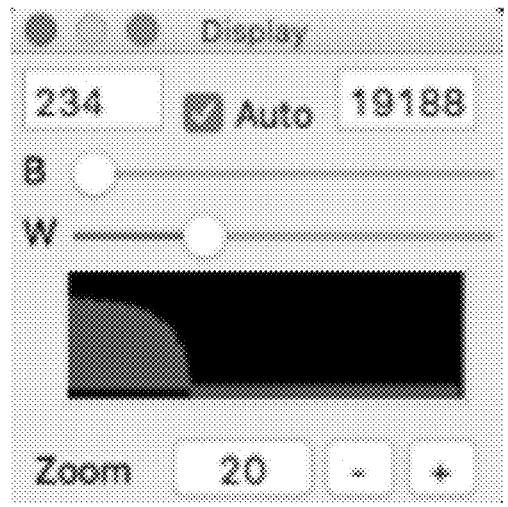
FIGURE 12c

 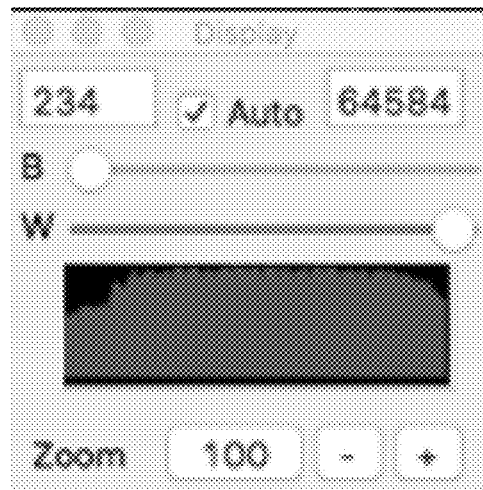
100% Intensity
FIGURE 13a
 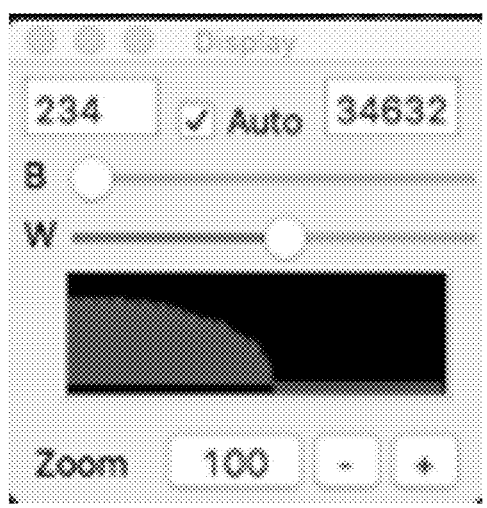
53.6% Intensity
FIGURE 13b

 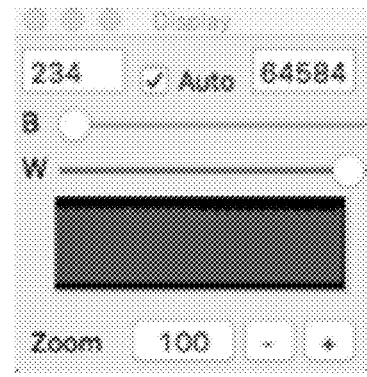
100% Intensity
FIGURE 14a
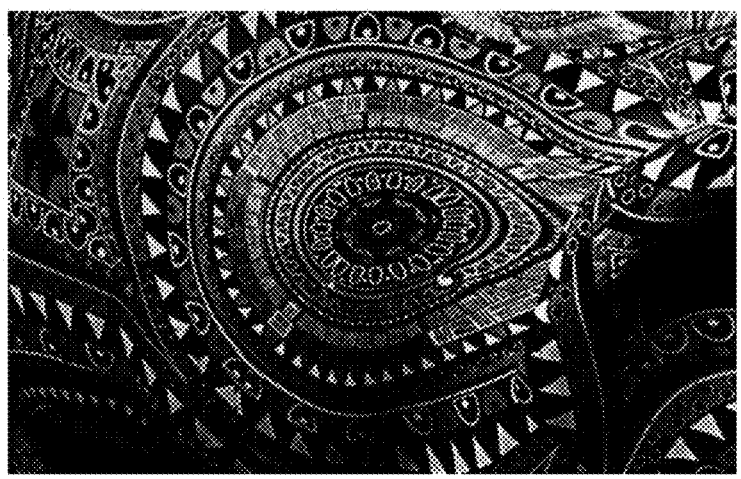 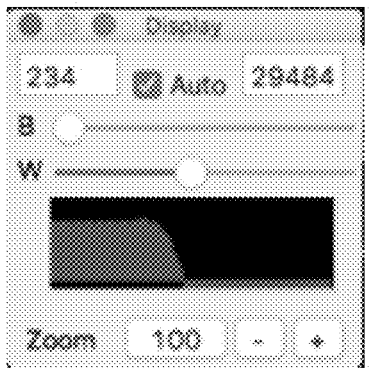
45.7% Intensity
FIGURE 14b

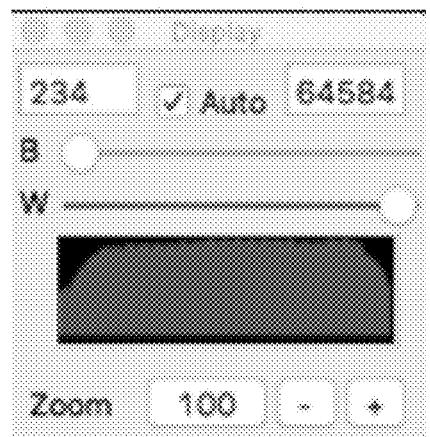
100% Intensity
FIGURE 15a
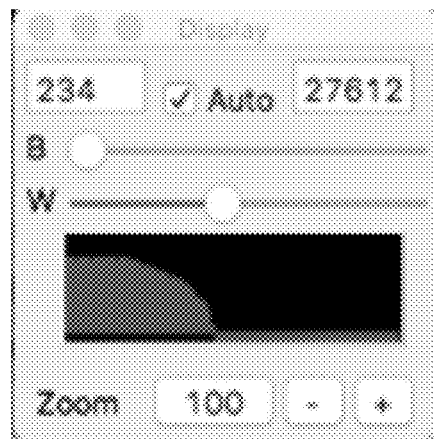
35.6% Intensity
FIGURE 15b

APPARATUS AND METHOD TO OBTAIN INTRINSIC STILL AND VIDEO IMAGES WITHOUT THE USE OF FILTERS OR DICHROIC MIRRORS

TECHNICAL FIELD

The invention relates to an apparatus and method to obtain intrinsic images and videos by eliminating the irrelevant illumination without the use of filters and dichroic mirrors.

BACKGROUND OF THE INVENTION

The primary goal of imaging is to obtain high-quality images and videos. Advancements toward this goal have been to improve cameras with respect to the optics and exposure mechanisms. Digital cameras with various pixel sensor arrays have greatly contributed to this effort. However, these efforts do not address spectral components that interfere with the quality of the image.

Normally conducting fluorescence imaging employs a narrow wavelength range of illumination directed towards a material to excite the molecular structure of the material. The resulting spectrum contains the emission components while eliminating the illumination component wavelengths by the use of dichroic mirrors and barrier filters. This results in a spectrum containing only spectral emission components.

Recently, methods have been developed where ordinary cameras have been shown to obtain intrinsic fluorescence images without the use of filters and dichroic mirrors. These patented methods describe how irrelevant illumination, i.e., components not absorbed by materials in the field of view, can be removed from the image by Intrinsic Processing. The specific imaging processes presented in these patents eliminate the irrelevant illumination and instrument spectral components, but the method to obtain the data varies and is not the most practical. For example, one method (U.S. Pat. Nos. 9,435,687 and 9,998,636, incorporated herein by reference in their entirety) requires four different fields of view and two different cameras. An improved method, (U.S. Pat. No. 10,652,484, incorporated herein by reference in its entirety) requires only one field of view and one camera, but images of the field of view must be taken with the field of view focused and defocused. While requiring only a single field of view, it is cumbersome to have to manually defocus the camera and risk shifting the field of view thus introducing errors into the processing. In addition, at low magnifications and high F stops, cameras may not have enough focal adjustment to completely eliminate the spatial detail in the field of view.

The ability to obtain intrinsic images with ordinary cameras can be valuable to any field that relies on obtaining intrinsic information with respect to identifying and validating the materials of interest. These fields include, but are not limited to, imaging in geology, forensics, agriculture, biology, astronomy, surveillance, meteorology, oceanography, and medicine.

Although the previous patented methods do produce Intrinsic images, the multiple fields needed for calibration, target and reference made data acquisition complex and difficult. The present invention provides a significant technological improvement and simplification in data gathering and processing for subsequent intrinsic image generation and visual display.

SUMMARY OF THE INVENTION

The present invention provides an apparatus and method to generate intrinsic images without barrier filters and dichroic mirrors. It involves acquisition of a focused field of view, followed by obtaining a diffused image of the same field of view, or vice versa. The diffused image is obtained by placing a translucent material in the path between the camera and field of view. The translucent material permits transmission of the illumination energy while diffusing the spatial details of the field of view, thus producing a featureless image of illumination intensities.

It is important that the diffused image of the same field of view preserves the characteristics of the illumination, for example, intensity gradients being the same as those of the focused image. Sets of said focused and diffused images may then be processed by two methods to produce intrinsic images.

The criteria of the translucent material necessary to produce a useful or optimal diffused image according to the present invention are:

1. The translucent material must pass all wavelengths of the illumination.
2. The resulting diffused image must not contain any spatial features of the focused image.
3. The diffused image must have the same illumination intensity distribution as the focused image, i.e., the same intensity gradient.
4. The translucent material must pass the illumination wavelength range proportionally, i.e., must not adsorb or emit disproportionately e.g., the translucent material must not have fluorescent properties.

MODES OF THE INVENTION

The invention applies to single-frame and multi-frame image acquisition, specifically, but not limited to, single exposure, multi-spectral, hyper-spectral and video acquisition. The structural format of the apparatus may be (1) separate and placed over the lens of a camera, (2) attached or incorporated into the camera or (3) provided to hold the camera. The position of the translucent material may be located and manipulated outside of the camera or within the body of the camera. For the purpose of the invention, the terms camera and image capturing device are non-limiting examples that are interchangeably used throughout the specification and are intended to cover other devices that are capable of acquiring images through a lens. Microscopes, telescopes, drone cameras, mirror-less cameras and satellites are non-limiting embodiments also covered by the instant invention.

Each set of a focused and a diffused image of a field of view is processed by software to eliminate the irrelevant illumination, i.e., non-absorbed illumination wavelengths, and illumination variation caused by transmission through the translucent material. Each set of images may undergo Simple Intrinsic Processing, where the intensity of each pixel of the diffused image is subtracted from the corresponding intensity of the focused pixel, or Advanced Intrinsic Processing, where the intensity of the residual components generated due to the illumination passing through the translucent material is also subtracted pixel by pixel from the focused image. When the calibrated residual is determined to have a low contribution, e.g., less than 5% of the illumination, due to the translucent material and automatic camera adjustments, the Simple method of processing may be deemed adequate.

BRIEF DESCRIPTION OF THE DRAWINGS

Further features and advantages of the invention will become apparent from the following detailed description taken in conjunction with the accompanying figures showing illustrative embodiments of the invention, in which:

FIGS. 2a and 2b show another embodiment of the apparatus that is attached to the lens of a camera or telescope that has a translucent material that can be moved out of and into the path between the lens and the field of view.

FIG. 6a shows the focused image of Tremolite, a fluorescent mineral, illuminated by 390 nm UV light.

FIG. 6b shows the same mineral of FIG. 6a imaged through translucent white paper. After simply processing the illumination undergoes total absorption by the mineral without any emission components.

FIG. 7a shows the focused image of Tremolite, fluorescent mineral, illuminated by 390 nm UV light.

FIG. 7b shows the same mineral of FIG. 7a imaged through translucent polyethylene. After simply processing the image reveals elimination of the irrelevant illumination and strong emission by the mineral.

FIG. 8a shows a calibration image of the focused clear sky.

FIG. 8b shows a calibration image of the diffused sky, according to the present invention.

FIG. 8c shows a calibration image after processing that is the Residual image representing the intensity difference due to the illumination passing through the translucent material.

FIG. 10a shows plots of unprocessed focused intensities, Simple Processing and Advanced Processing across the row of pixels of the analysis area indicated by the white line in the images in FIG. 9a.

FIG. 12b shows the close-up diffused image of the same section of the bolder shown in FIG. 12a FIG. 12c shows the same section of the bolder shown in FIG. 12a after Simple Intrinsic processing revealing a complex pattern of fluorescent material, where the highest intensity of the intrinsic image was 29.7 percent of the focused image indicating elimination of 70.3 percent of irrelevant illumination from the image.

FIG. 13a shows a focused image of cumulous clouds.

FIG. 13b shows the image of the clouds shown in FIG. 13a after Intrinsic processing, where the highest intensity of the intrinsic image was 53.6 percent of the focused image indicating elimination of 46.4 percent of the irrelevant illumination from the image.

FIG. 14a shows a focused image of a colorful complex pattern.

FIG. 14b shows an image of the pattern after Simple Intrinsic processing, where the highest intensity of the intrinsic image was 45.7 percent of the focused image indicating elimination of 54.3 percent of the irrelevant illumination from the image.

FIG. 15a shows a focused image of a reproduction print.

FIG. 15b shows an image of the print shown in FIG. 15a after Intrinsic processing, where the highest intensity of the intrinsic image was 35.6 percent of the focused image indicating elimination of 64.4 percent of the irrelevant illumination from the image and the intrinsic blue areas appearing washed out in the focused image by the illumination.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Apparatus Configurations

Figure 1A:
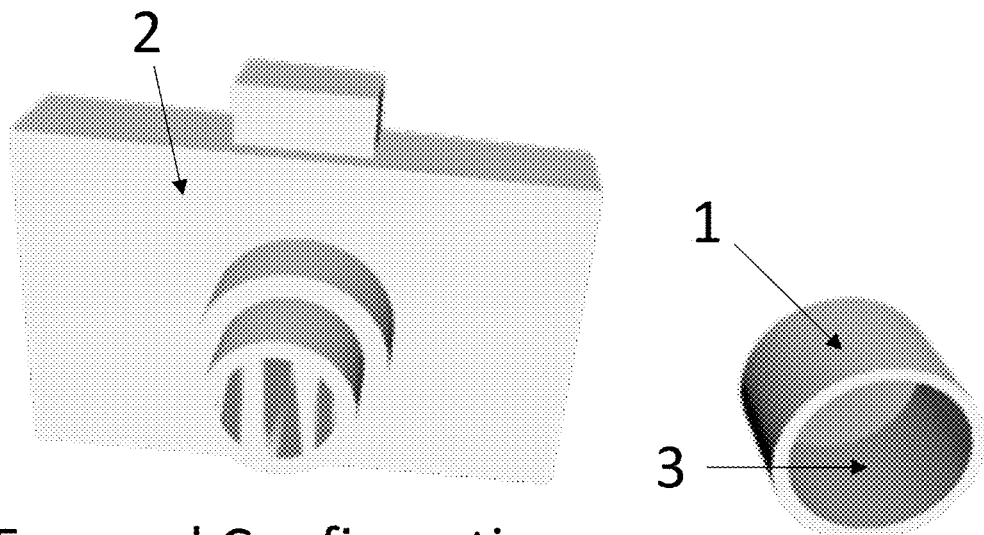
FIGS. 1a and 1b show an apparatus with one end covered by a translucent material that is placed over the lens of a camera.
Figure 1B:
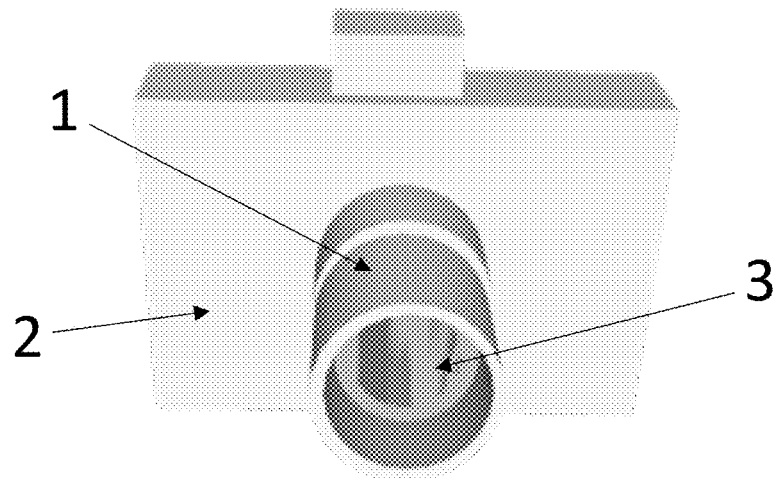
Figure 3A:
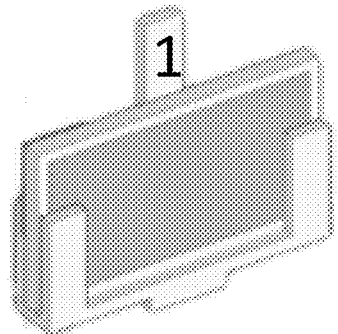
FIGS. 3a-3c show another embodiment of the apparatus that holds a Smart Phone or Tablet equipped with a self-adjusting camera and a translucent material that may be moved out of and into the path between the camera lens and the field of view.
Figure 3B:
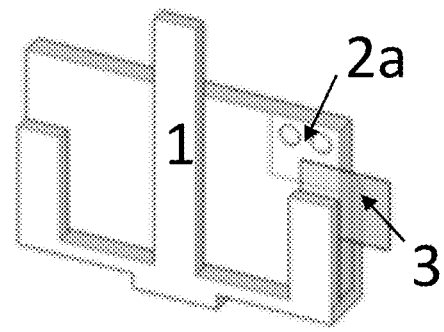
Figure 3C:
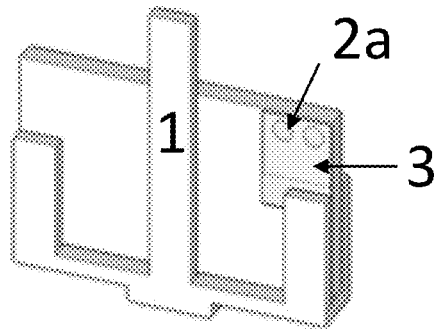
Figure 4A:
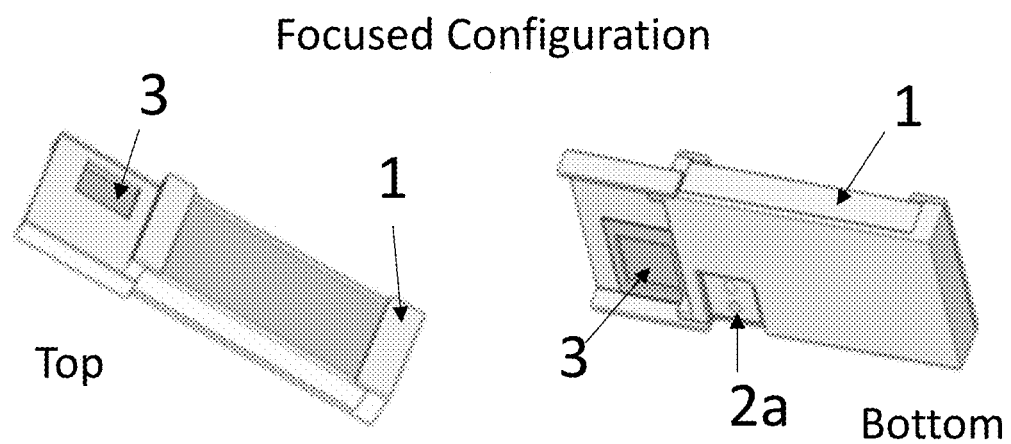
FIGS. 4a and 4b show another embodiment of the apparatus that holds a Smart phone equipped with a self-adjusting camera and a translucent material that may be moved out of and into the path between the camera lens and the field of view.
Figure 4B:
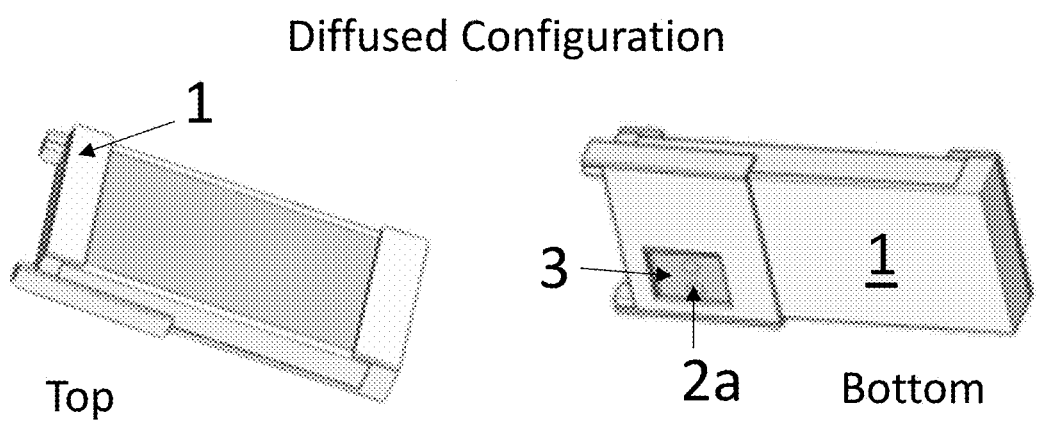

The simplest configuration of the apparatus is where the apparatus 1 containing the translucent material (diffusing element) 3 is placed over the camera 2 to generate a diffused image, as shown in FIGS. 1a and 1b. Another configuration is achieved by attaching an apparatus 1 that includes the translucent material 3 to the camera 2 so that it is moved into and out of the path between the field of view and the camera lens, as shown in FIGS. 2a and 2b. This format is appropriate for long lens cameras and telescopes since their optical tube is considered as the lens of the camera.

A third configuration of the apparatus is where the apparatus 1 holds the body or casing of the camera and the translucent material 3 is rotatably moved into and out of the path between the camera lens 2a and the field of view. This format is appropriate for use with smart phones and tablets that have self-adjusting cameras 2a, as shown in FIGS. 3a-3c and FIGS. 4a-4b, where it is impractical or difficult to attach or incorporate the diffusing element on the camera lens 2a. For the purpose of the invention, rotatably moved means that the diffusing element is rotated or pivoted (in any direction or plane) in relation to the holding apparatus or the camera in order to position the diffusing element in front or away from the camera lens.

Figure 16:
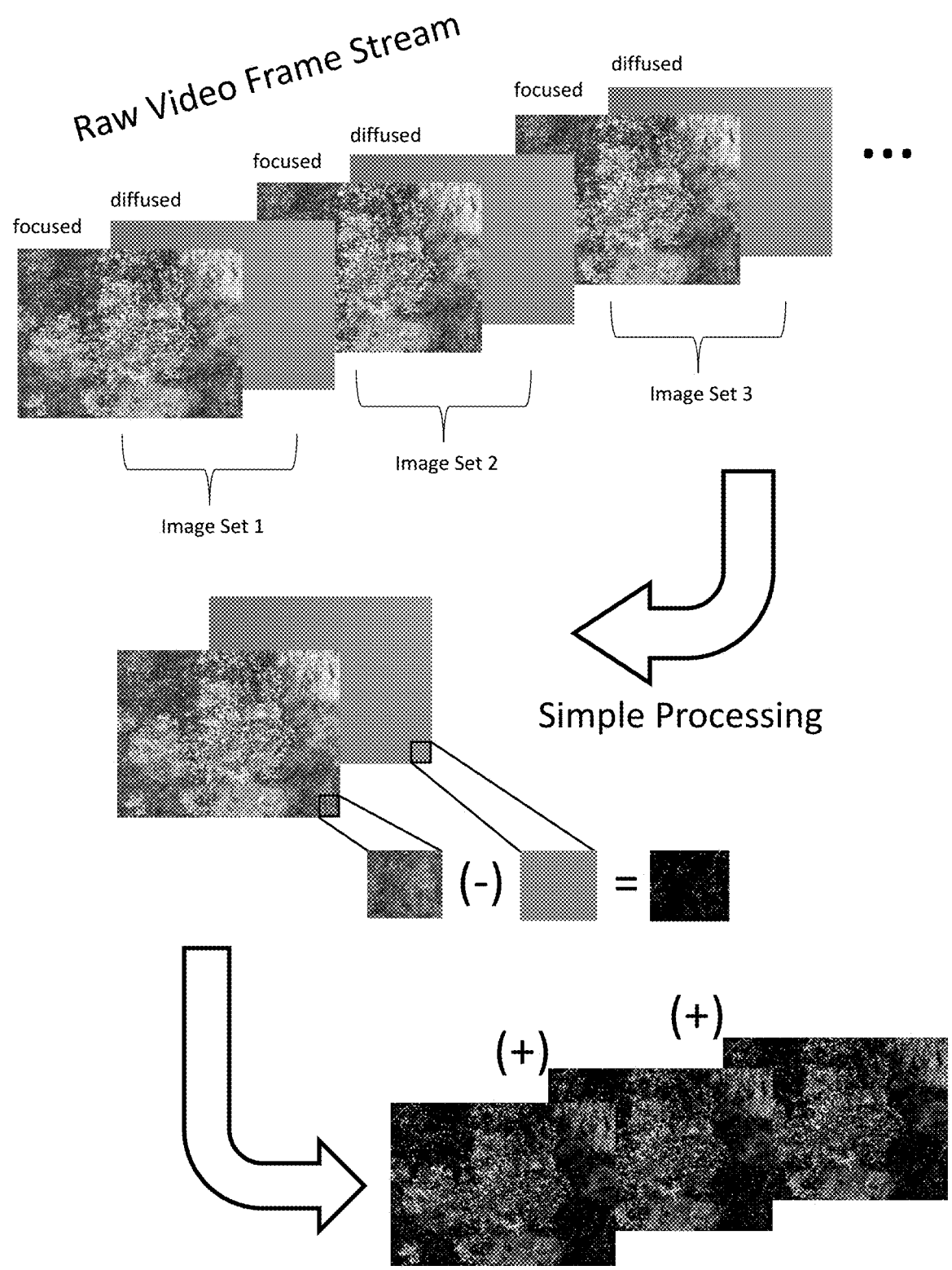
FIG. 16 illustrates a method of producing intrinsic video image according to the present invention.

The application of the invention to video cameras needs a format to produce a continuous stream of sets of focused and diffused video images. The preferred method includes, but is not limited to, a rotating wheel (synchronizing element) 1a synchronized with the frame rate of the camera 2 so that every other frame produces a focused image followed by a diffused image, or vice versa. This can be achieved by a wheel that is open (passthrough) on one half of the area 3a and covered with a translucent material 3 on the other open half of the wheel. Synchronizing the rotation of this wheel to half speed of the frame rate of the video camera will produce the stream of sequential image sets containing a focused image followed by a diffused image that can be processed by the method of the present invention into an Intrinsic video. For example, the rotating wheel can be operated at 30 rotations per second when a 60 frames per second (fps) video camera is used in order to obtain 60 sequentially alternating focused and diffused images, one image per frame as illustrated in FIG. 16. In accordance with the Simple Processing method of the invention, 30 sets of alternating focused and diffused images (total of 60 images) are processed per second where the intensities of the diffused image are subtracted pixel-by-pixel from the intensities of the focused image to obtain an intrinsic video comprising of 30 consecutive intrinsic frames per second that will be played at 30 fps.

For the Advanced Processing, a single Residual image is calculated and stored in memory to be used until a new Residual image is calculated. According to above example, the same calculated Residual image is added to each the 30 diffused images previously obtained to generate 30 adjusted diffused images which in turn are subtracted pixel-by-pixel from the obtained focused images to generate an intrinsic video comprising of 30 consecutive intrinsic frames per second that will be played at 30 fps.

According to an embodiment of the invention, the Residual image can be calculated from a single set of calibration focused and diffused images (for example from a clear sky) obtained through the synchronized rotating wheel as previously explained. Alternatively, a plurality of Residual images can be calculated from a plurality of calibration focused and diffused images sets, where an average Residual image can be calculated by averaging pixel-by-pixel the intensities of all the calculated Residual images. If the video camera also has a still image capturing feature, it is also envisioned that the Residual image can be calculated with a focused and diffused still image obtained by the camera. The calculated Residual image is valid as long as the illumination or translucent material is not changed. Accordingly, for intrinsic video purposes one residual image is enough since the frames of the video are taken under constant conditions.

Figure 5A:
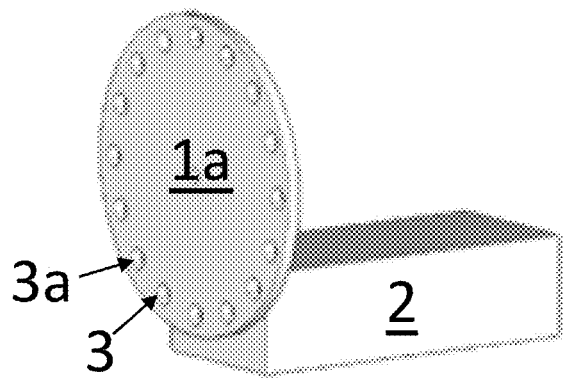
FIGS. 5a-5c shows an apparatus that attaches to a [2] video camera with a [1] rotating wheel with holes along its rim that are covered with a [3] translucent material on alternating opens.
Figure 5B:
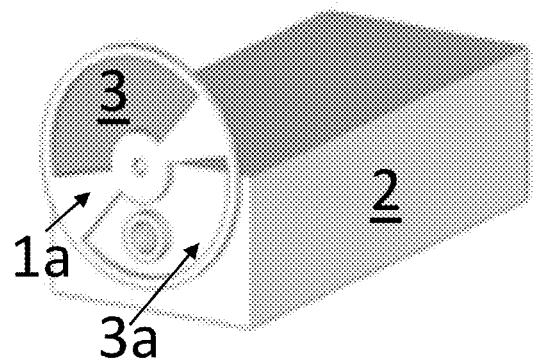
Figure 5C:
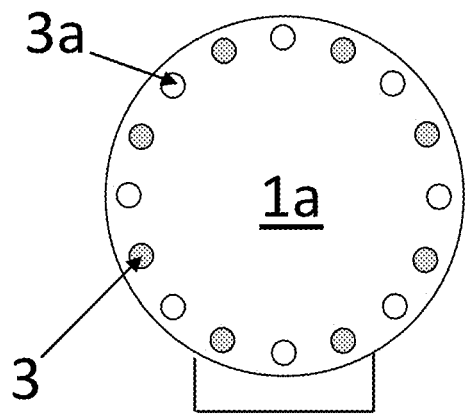

With high video frame rates, the format is extended to a wheel with multiple passthrough holes 3a along its rim with alternating open and translucent coverings 3. These formats of the apparatus are illustrated in FIGS. 5a-5c. The synchronizing element 1a can also be provided inside the video camera 2. In the preferred embodiment, the synchronizing element 1a is a rotating wheel, but it can also be implemented by other moving mechanisms such as but not limited to pivoting, or linear that allows the video camera 2 to obtain the same set of focused and a diffused video images according to the method of the present invention.

Intrinsic Image Processing

Images contain many different spectral components including absorption, emission intrinsic reflection and irrelevant illumination. Irrelevant illumination is defined as the illumination components that are not absorbed by the field of view. This irrelevant illumination is a major spectral component and acts like a fog or the noise when considering the process in terms of a signal to noise ratio. Namely, by reducing the "noise", the intrinsic components are revealed.

Classical methods to obtain intrinsic emissions, i.e., fluorescence, of materials require narrow excitation illumination obtained with lasers and narrow band pass filters, followed by eliminating the excitation illumination after it has impinged on the target material using long pass filters and dichroic mirrors. These filters and mirrors eliminate the illumination components that have not been absorbed revealing intrinsic emission.

The previously incorporated by reference patents present novel methods, referred to as Intrinsic processing, that accomplish the same result without the use of filters and dichroic mirrors. However, wide wavelength ranges of illumination can cover the whole absorption envelop, such as solar radiation. Under this condition, intrinsic emission is not the only spectral component obtained using Intrinsic processing. Intrinsic processing reveals that there are two components that comprise reflection, total illumination reflection and intrinsic reflection. Illumination reflection reflects the whole wavelength range of the illumination by the materials, and in the case of solar radiation, the reflection is considered white light. Intrinsic reflection is the proportional residual illumination components that are not absorbed by the materials in a field of view. The Intrinsic reflection gives rise to the perceived color of materials even though it might be a small component compared to the total illumination. An analogy to consider is mixing colored paint where relatively small amounts of pigments, i.e., the intrinsic components, produce a brightly colored paint whose base color is white.

The present invention provides two methods to eliminate the irrelevant illumination components: (1) Simple Intrinsic processing where pixel-by-pixel subtraction of intensities of the diffused image from the intensities of the focused image is performed, and (2) Advanced Intrinsic processing where the residual image components are determined using a calibration field of view empty of spatial detail by subtracting pixel-by-pixel the intensities of an obtained calibration diffused image of the field of view empty of spatial detail from the corresponding intensities of an obtained calibration focused image of the same field of view empty of spatial detail to obtain a residual image. The intensities of this residual image are added pixel-by-pixel to the intensities of the diffused image to generate an adjusted diffused image and these in turn are subtracted pixel-by-pixel from the intensities of the focused image.

Much effort has been expended on modeling spectral foreground components such as aerosols, water vapor and particulates to eliminate them from images of distant fields of view, for example, images taken from satellites. The success of the Intrinsic processing methodology of this invention is that the image of the diffused illumination is taken of the same field of view, under the same camera conditions and close to the same time as the focused image. This provides the most accurate real time illumination and foreground data of the field of view to process the focused image.

The Simple Intrinsic method of image processing is considered simple in that the intensities of the diffused image are subtracted pixel-by-pixel from the intensities of the focused image. This removes the irrelevant illumination, as well as, any intensity gradients, such that the intrinsic components are revealed that were otherwise hidden within the total reflected energy.

The Advanced Intrinsic method of image processing is considered advanced since it accounts not only for the irrelevant illumination, but also for loss of illumination energy due to transmission through the translucent material. This advanced method also accounts for any changes in settings, such as automatic adjustment of exposure time and refocusing that may occur in automatic cameras when optimizing the image. This process requires that the camera takes a calibration set of focused and diffused images of a field of view empty of spatial detail and determines the residual image arising from any changes in the camera, as well as, the loss of illumination due to transmission through the translucent material.

The creation of an Intrinsic video can be accomplished real-time or in a post-processing procedure. According to an embodiment of the invention, the Intrinsic video processing first involves identifying the image sets of focused and diffused images obtained, where each set is processed separately to produce an Intrinsic frame. The Intrinsic frames are then streamed or combined sequentially and played at half the frame rate of the original camera to produce the Intrinsic video image according to the present invention, as illustrated in FIG. 16.

EXAMPLES

The following examples present: (1) criteria for the translucent material, (2) analysis of the intrinsic processing, (3) spectral contributions to classical and intrinsic images, and (4) perceived differences of images. Note that all photographic images shown in the figures were taken with the automatic adjusting of an Apple® iPhone® 11 camera.

Example 1. Translucent Material

The criteria of two translucent materials were tested and the results presented in FIGS. 6a-6b and FIGS. 7a-7b. When white paper was used as the translucent material, the blue irrelevant illumination remained in the Intrinsic image in FIG. 6b. This indicates that illumination of 390 nm did not pass through the translucent white paper so as to be eliminated by the Intrinsic processing. In addition, the black appearance of the Tremolite mineral indicates strong absorbance of the 390 nm illumination. However, when polyethylene was used as the translucent material, the translucent criteria were met revealing the mineral fluorescing bright red with the black background indicating that the irrelevant illumination has been eliminated by Intrinsic processing (FIG. 7b).

Example 2. Separation of the Spectral Components of an Image

Figure 9A:
FIG. 9a shows the focused image of a leaf illuminated by direct sunlight, the white line indicates the row of pixels (row 1900 from columns 1000-2000) to be analyzed.
Figure 10A:
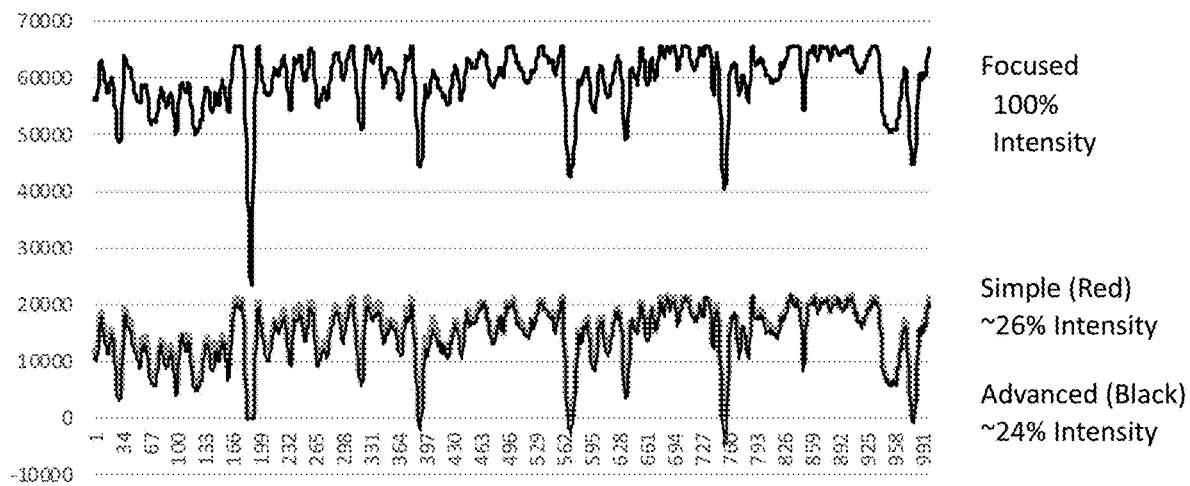

The spectral components of the image in FIG. 9a have been separated by Intrinsic processing and plotted in FIG. 10a over a range of 1000 pixels of row 1900 of the image.

The calibration set of focused and diffused images in FIGS. 8a and 8b, respectively, were taken of a clear sky to generate the Residual image (FIG. 8c) that determines the loss of spectral components when the illumination passes through the translucent material. The intensity of the Residual across the analysis row was determined to be less than 2 percent.

Figure 9B:
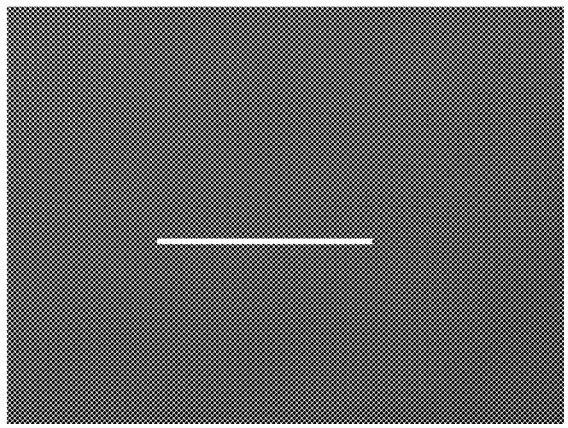
FIG. 9b shows the diffused image of the leaf of FIG. 9a, the white line indicates the row of pixels (row 1900 from columns 1000-2000) to be analyzed.
Figure 9C:
FIG. 9c shows the image of the leaf of FIG. 9a after Intrinsic processing, the white line indicates the row of pixels (row 1900 from columns 1000-2000) to be analyzed.
Figure 10B:
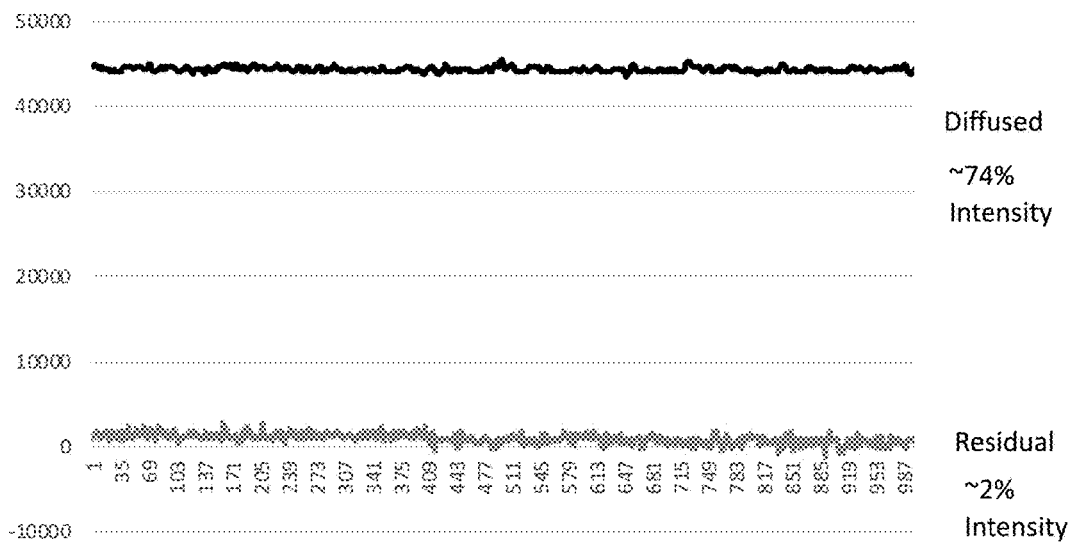
FIG. 10b shows plots of the intensity of the same row of pixels of the diffused image and the Residual intensities from in the same row of pixels in the calibration images of FIGS. 8a-8c used to perform the Advanced Intrinsic processing.

FIGS. 9a-9c show the set of focused, diffused and Intrinsic images, respectively, of a deteriorating leaf under direct sun light. To gain a qualitative and quantitative understanding of how the spectral components relate to each other, intensity of pixels from row 1900 across columns 1000-2000 indicated by the white line, were plotted in FIGS. 10a-10b. The plots in FIG. 10a are the intensities of the pixels of row 1900 of the focused image before and after Simple and Advanced Intrinsic processing. The plots in FIG. 10b show the intensities of the diffused and Residual spectral components across this row of pixels when imaged through the translucent material. The intensity plot of the diffused image represents about 74 percent of the intensity of each of the pixels across the analysis range of row 1900 of the focused image. The Residual spectral component represents about 2 percent of the residual intensity of the clear sky calibration images in FIGS. 8a-8c. Note that in this set of images, the Residual spectral components do not contribute a significant degree to a difference between the Simple and Advanced intrinsic images, as shown in the plots in FIG. 10a.

Example 3. Spectra of Reflected Components

Figure 11A:
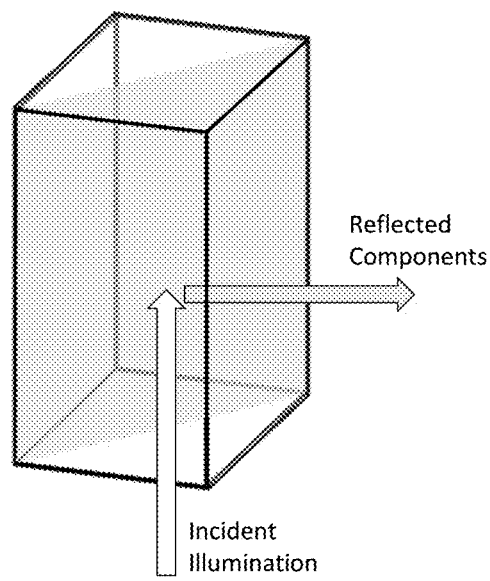
FIG. 11a shows the reflection configuration to analyze yellow paper.
Figure 11B:
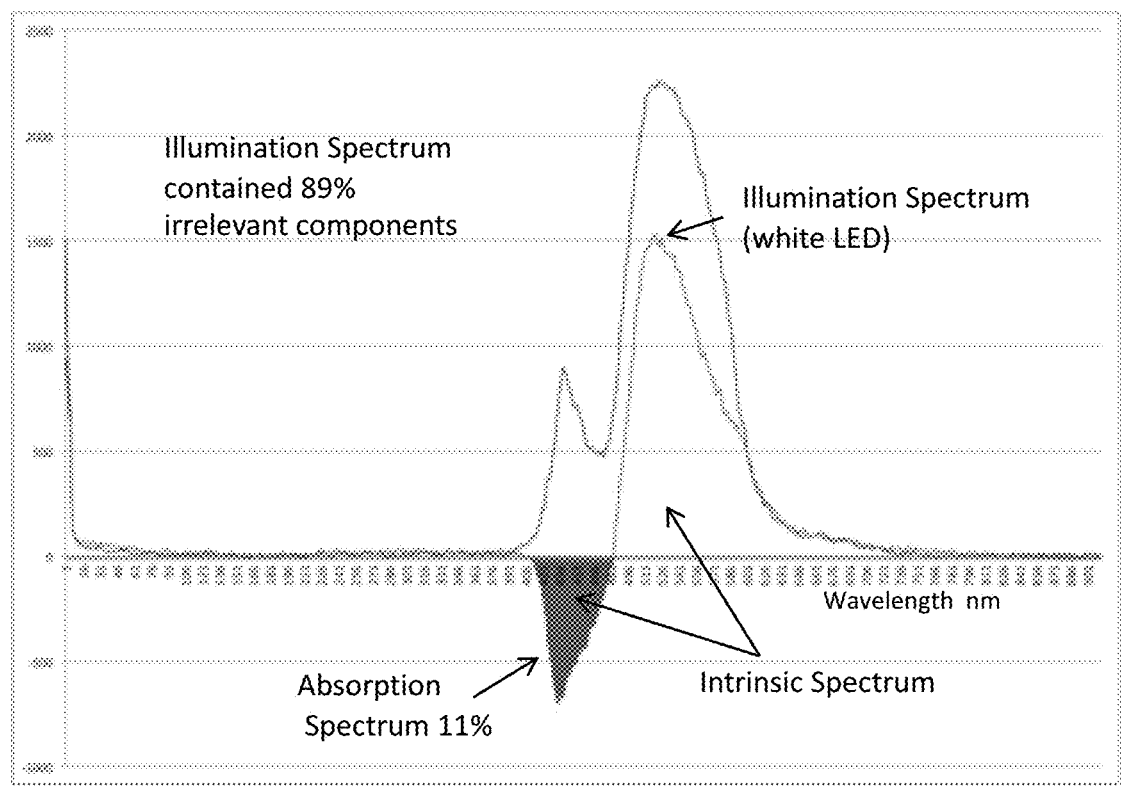
FIG. 11b shows the spectrum of white LED illumination and the Intrinsic spectrum of the reflected spectral components, where 89 percent of the illumination was determined to be irrelevant and 11 percent of the illumination was absorbed by the yellow paper.

A sample of yellow paper was placed diagonally in a cuvette such that it was illuminated with a white LED at a 45° angle and the reflected energy was detected at an angle of 90° from the illumination, as illustrated in FIG. 11a. The spectrum in blue represents the complete spectrum of the white LED illumination. The spectrum in red represents the intrinsic spectrum reflected off the yellow paper after the irrelevant illumination components have been eliminated. The portion in the UV/blue/green range of the intrinsic spectrum has negative values indicating the absorption component from the white LED illumination (FIG. 11b). This absorption was found to be 11 percent of the integrated illumination. The proportions of the intrinsic spectrum in the yellow/red range have positive values, representing components greater than 11 percentage of the expected reflected residual illumination. It appears that the sample of yellow paper had fluorescence properties where the emission components provided a significant amount of the positive portion of the intrinsic spectrum. With respect to the intrinsic spectrum, 89 percent of the illumination was not absorbed, considered irrelevant and eliminated by the intrinsic processing algorithms.

Figure 12A:
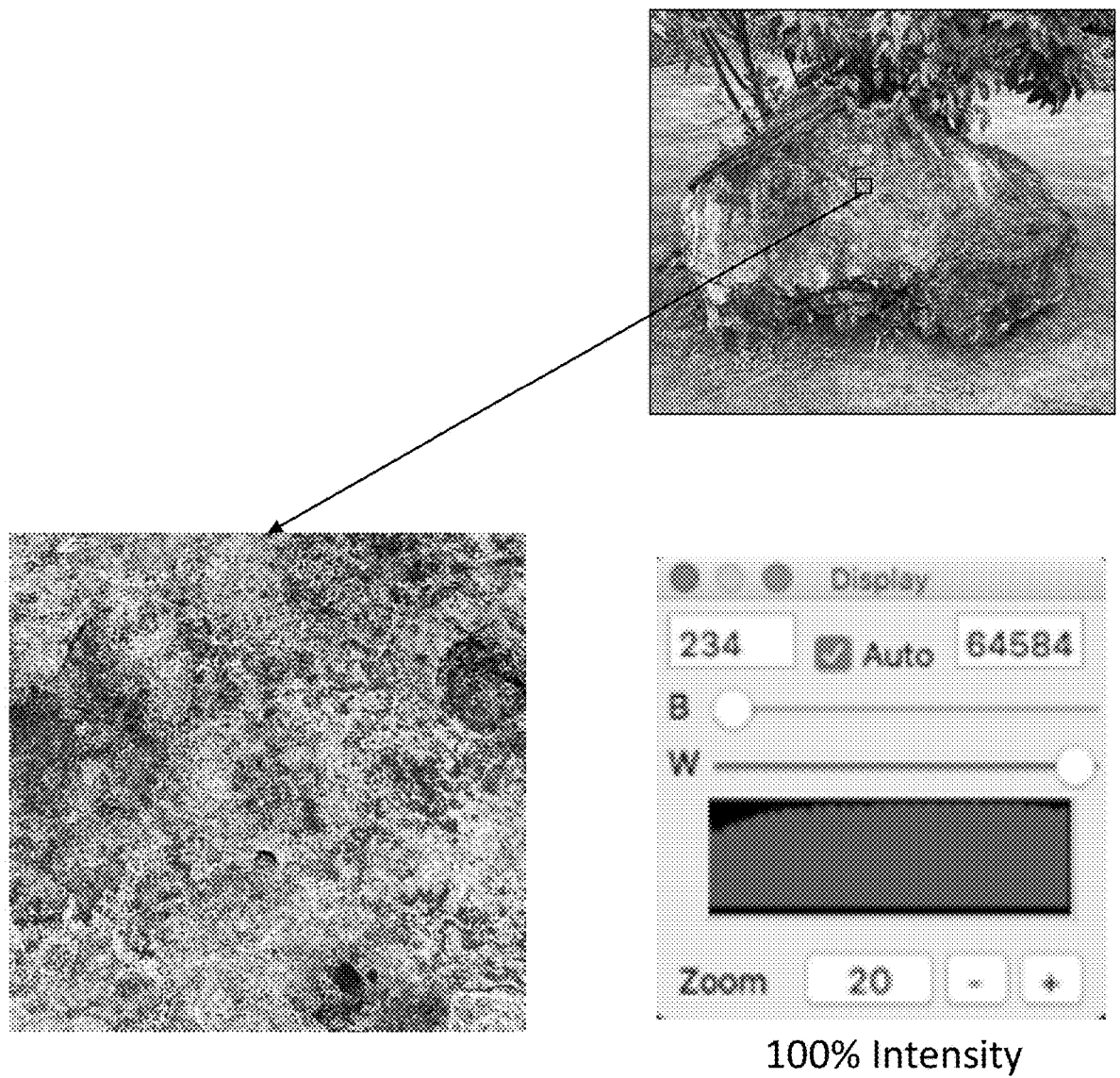
FIG. 12a a bolder illuminated by direct sunlight with a close-up focused image of a section of the bolder

Example 4. Perceived Differences Between the Normal Focused and Intrinsic Images The focused images appear close to how the field of view is normally perceived by eye. However, Intrinsic processing produces darker images with more intense colors. This is because the irrelevant illumination components have been eliminated from the image leaving only the intrinsic spectral components reflected, as seen in the fluorescence image in FIG. 12c and the intrinsic reflective images in FIGS. 13b-15b. These images trend to support the paint mixing analogy where the intensity of the perceived color is derived from a small amount of the intrinsic components serving as the pigments within the white base of illumination. In addition, the regional boundaries within the Intrinsic images appear to be sharper than in the focused image.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:

1. A method to obtain intrinsic images of a field of view without irrelevant illumination components, where said images are obtained with an image capturing device without the use of filters or dichroic mirrors, the method comprising:
    obtaining a focused image and a diffused image of a same field of view of interest; and
    subtracting an intensity of each pixel of the diffused image from a corresponding intensity of a pixel of the focused image to eliminate irrelevant illumination from said focused image to obtain an intrinsic image of said field of view of interest.

2. The method of claim 1, wherein the focused image, the diffused image and the intrinsic image are still images.

3. The method of claim 1, wherein the focused image, the diffused image and the intrinsic image are video images.

4. The method of claim 3, wherein the focused video image and the diffused video image are obtained through a synchronizing element comprising at least one diffusing element and an equal number of passthrough openings.

5. The method of claim 4, wherein a number of diffusing elements and passthrough openings of said synchronizing element is defined by a frame rate of the image capturing device that obtains said focused video image and said diffused video image.

6. The method of claim 4, wherein movement of said synchronizing element is synchronized to half speed of a frame rate of the image capturing device and a plurality of sets of sequentially alternating focused and diffused video images is obtained, each image corresponding to a sequential frame of a video from the field of view of interest.

7. The method of claim 6, wherein each set of diffused video image is subtracted from its corresponding focused video image to generate a number of intrinsic video frames that are sequentially combined to generate an intrinsic video image.

8. The method of claim 6, wherein said intrinsic video image is reproduced at a rate equal to the number of said intrinsic video frames per second.

9. The method of claim 4, wherein said synchronizing element is provided inside said image capturing device.

10. The method of claim 1, wherein said diffused image is obtained by positioning a diffusing element in a path between the field of view of interest and a lens of an image capturing device.

11. The method of claim 10, wherein positioning said diffusing element in and out of said path is manually controlled, mechanically controlled or a combination thereof.

12. The method of claim 10, wherein a removable adapter including said diffusing element is removably positioned over the lens of said image capturing device.

13. The method of claim 10, wherein said diffusing element is incorporated into a body of said image capturing device.

14. The method of claim 10, wherein said diffusing element is part of a holding apparatus receiving a body of said image capturing device within.

15. The method of claim 14, wherein said diffusing element is rotatably moved in relation to said holding apparatus.

16. The method of claim 10, wherein said diffusing element comprises a translucent material.

17. The method of claim 16, wherein said translucent material allows passage of all wavelengths of illumination proportionally.

18. The method of claim 16, wherein said translucent material is selected so that the diffused image have spatial features removed from the focused image.

19. The method of claim 16, wherein said translucent material is selected so that the diffused image has a same illumination intensity distribution with a same intensity gradient as the focused image.

20. The method of claim 16, wherein said translucent material does not have fluorescent properties.

21. The method of claim 10, wherein said diffusing element is provided inside said image capturing device.

22. A method to obtain intrinsic images of a field of view without irrelevant illumination components, without the use of filters or dichroic mirrors comprising:
    obtaining a calibration focused image and a calibration diffused image of a same field of view empty of spatial detail;
    subtracting an intensity of each pixel of the calibration diffused image from a corresponding intensity of a pixel of the calibration focused image to obtain a residual image;
    obtaining a focused image and a diffused image of a same field of view of interest different from the field of view empty of spatial detail;
    adding an intensity of each pixel of the residual image to a corresponding intensity of the pixel of the diffused image to obtain an adjusted diffused image; and
    subtracting an intensity of each pixel of the adjusted diffused image from a corresponding intensity of a pixel of the focused image to eliminate irrelevant illumination from said focused image to obtain an intrinsic image of the field of view of interest.

23. The method of claim 22, wherein the calibration focused image, the calibration diffused image, the residual image, the focused image, the diffused image and the adjusted diffused image are still images.

24. The method of claim 22, wherein the calibration focused image, the calibration diffused image, the focused image, the diffused image and the adjusted diffused image are video images.

25. The method of claim 24, wherein the calibration focused image, the calibration diffused image, the focused image and the diffused image are obtained through a synchronizing element comprising at least one diffusing element and an equal number of passthrough openings.

26. The method of claim 25, wherein a number of diffusing elements and passthrough openings of said synchronizing element is defined by a frame rate of an image capturing device obtaining said calibration focused image, said calibration diffused image, said focused image and said diffused image.

27. The method of claim 25, wherein movement of said synchronizing element is synchronized to half speed of a frame rate of an image capturing device and a plurality of sets of sequentially alternating focused and diffused video images is obtained, each image corresponding to a sequential frame of a video from the field of view of interest.

28. The method of claim 27, wherein at least one set of sequentially alternating calibration focused and calibration diffused video images is obtained from which said residual image is calculated.

29. The method of claim 28, wherein said residual image is an average of a plurality of residual images calculated from a plurality of sets of sequentially alternating calibration focused and calibration diffused video images.

30. The method of claim 27, wherein said residual image is added to the diffused video image of each set to generate an adjusted diffused image which is subtracted from the diffused image of the set to obtain a plurality of intrinsic video frames of the field of view of interest.

31. The method of claim 30, wherein said plurality of intrinsic video frames are sequentially combined to generate an intrinsic video image.

32. The method of claim 31, wherein said intrinsic video image is reproduced at a rate equal to the number of said intrinsic video frames per second.

33. The method of claim 25, wherein said synchronizing element is provided inside said an image capturing device.

34. The method of claim 22, wherein the calibration diffused image and the diffused image are obtained by positioning a diffusing element in a path between said field of view of interest and a lens of an image capturing device.

35. The method of claim 34, wherein movement of said diffusing element into and out of said path is manually controlled, mechanically controlled or a combination thereof.

36. The method of claim 34, wherein a removable adapter including said diffusing element is removably positioned over the lens of said image capturing device.

37. The method of claim 34, wherein said diffusing element is incorporated into a body of said image capturing device.

38. The method of claim 34, wherein said diffusing element is part of a holding apparatus receiving a body of said image capturing device within.

39. The method of claim 38, wherein said diffusing element is rotatably moved in relation to said holding apparatus.

40. The method of claim 34, wherein said diffusing element comprises a translucent material.

41. The method of claim 40, wherein said translucent material allows passage of all wavelengths of illumination proportionally.

42. The method of claim 40, wherein said translucent material is selected so that the calibration diffused image and the diffused image have spatial features removed from the calibration focused image and focused image, respectively.

43. The method of claim 40, wherein said translucent material is selected so that the calibration diffused image and the diffused image have a same illumination intensity distribution with a same intensity gradient as the calibration focused image and the focused image, respectively.

44. The method of claim 40, wherein said translucent material does not have fluorescent properties.

45. The method of claim 34, wherein said diffusing element is provided inside said image capturing device.

* * * * *